United States Patent [19]
Radke et al.

[11] Patent Number: 6,062,156
[45] Date of Patent: May 16, 2000

[54] SNOWMOBILE POWERED WATERCRAFT

[76] Inventors: Glen Radke, 8910 Tieton Dr.; Oscar Koboski, 663 Old Naches Hwy., both of Yakima, Wash. 98908

[21] Appl. No.: 09/094,358

[22] Filed: Jun. 9, 1998

[51] Int. Cl.[7] ...................................................... B60F 3/00
[52] U.S. Cl. .................... 114/144 R; 114/292; 114/123; 440/12.5; 440/12.63
[58] Field of Search .................................. 114/61.1, 123, 114/292, 68, 69, 364, 343, 284, 281, 279, 144 R; 440/11, 12.5, 12.56, 12.63

[56] References Cited

U.S. PATENT DOCUMENTS

| | | | |
|---|---|---|---|
| 1,101,287 | 6/1914 | Katko | 114/123 |
| 1,855,076 | 4/1932 | Warner | 114/285 |
| 3,520,265 | 7/1970 | Sanford | 114/285 |
| 3,521,595 | 7/1970 | Mix | 115/1 |
| 3,626,891 | 12/1971 | Sessions | 115/1 |
| 3,646,904 | 3/1972 | Lanning et al. | 115/1 |
| 3,707,938 | 1/1973 | Olson | 115/1 |
| 3,853,085 | 12/1974 | Halboth | 115/1 |
| 4,625,674 | 12/1986 | Covington | 114/123 |
| 4,893,692 | 1/1990 | Smith | 180/190 |
| 5,150,662 | 9/1992 | Boyd et al. | 114/68 |
| 5,682,832 | 11/1997 | Millard | 114/123 |

FOREIGN PATENT DOCUMENTS

| | | | |
|---|---|---|---|
| 1002650 | 2/1957 | Switzerland | 440/11 |

*Primary Examiner*—Stephen Avila
*Attorney, Agent, or Firm*—Richardson & Folise

[57] ABSTRACT

A snowmobile powered watercraft which includes a pair of forward pontoons mounted to the front suspension in place of conventional skis and an U-shaped rear pontoon mounted to the aft portion of the snowmobile body. Propulsion is provided by the endless track assembly of the snowmobile which extends in part beneath the rear pontoon. Also disclosed is a structural assembly for converting the snowmobile into a watercraft which includes the forward and rear pontoons.

4 Claims, 4 Drawing Sheets

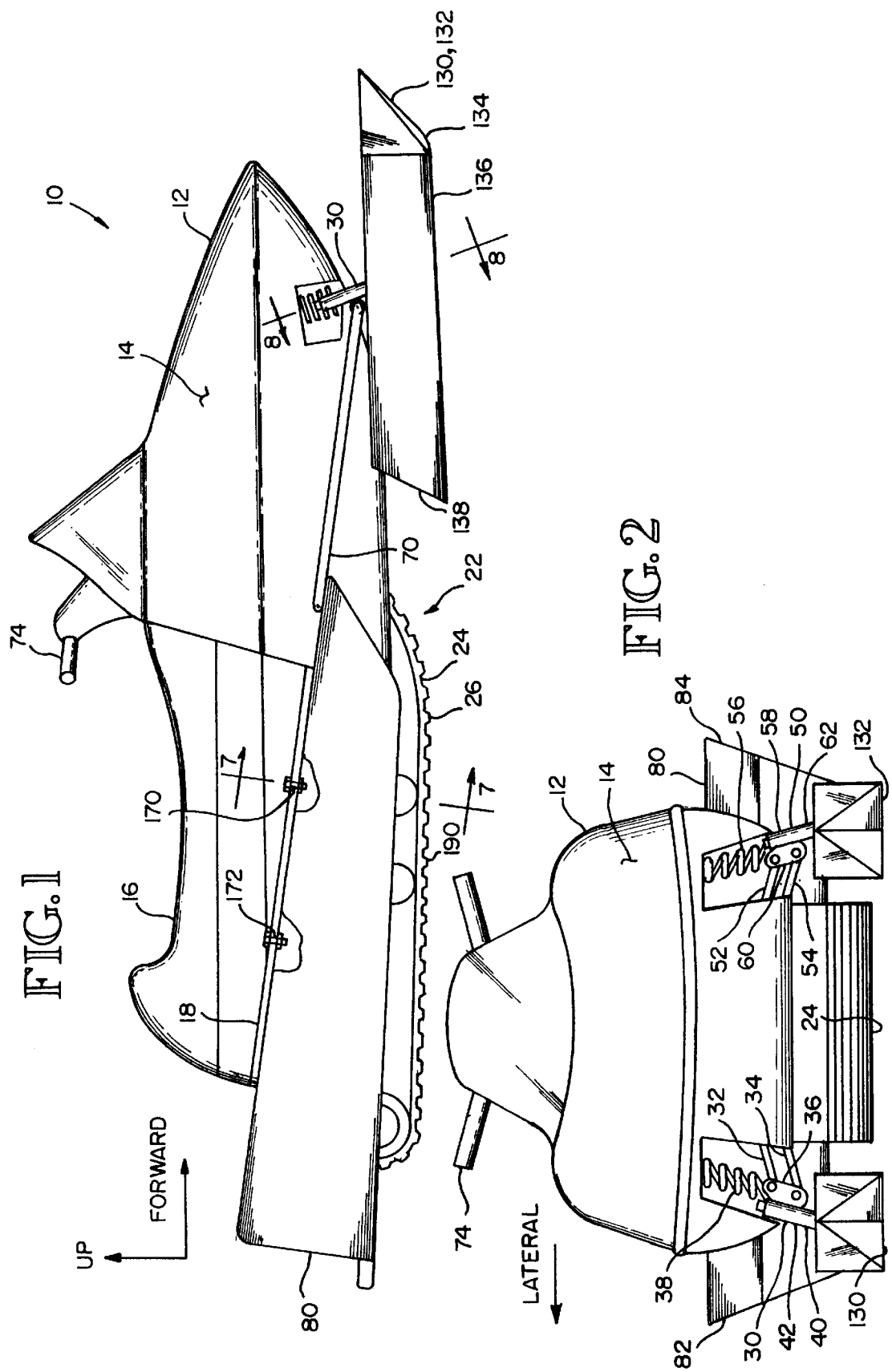

SNOWMOBILE POWERED WATERCRAFT

BACKGROUND OF THE INVENTION

This invention generally relates to self propelled watercraft and more particularly to a snowmobile powered watercraft and to a structural assembly for converting a snowmobile into such a craft.

In recent years snowmobiles have become very popular for recreational use. In areas of the country where the ground is snow covered for significant portions of the year they are widely used for basic off road transportation. They have also proven to be invaluable for winter search and rescue operations in the back county and mountainous terrain. Typically these vehicles have a fiberglass body with an elongated cushioned seat mounted atop the aft portion of the body. They are powered by a gasoline engine mounted within the body which drives an endless track mechanism through a clutch assembly. The forward portion of the body is supported by a pair of laterally spaced skis mounted to struts which extend downward from the body. The skis are steered by a handlebar mechanism mounted just forward of the seat and connected to the struts by a steering mechanism.

While snowmobiles are highly useful and versatile vehicles they are relatively expensive and inherently limited to use on snow covered terrain. As a result, they are limited to use in geographic areas where there is some significant annual snow fall and during periods of the year where there is at least a few inches of standing snow cover.

Accordingly, it is a primary object of this invention to provide for a structural assembly for converting a snowmobile into a self propelled watercraft, thereby substantially extending the portion of the year during which the vehicle is useable. Broadly speaking, the conversion of a snowmobile into a watercraft is not entirely unknown. For example, it as been proposed in the past to equip a snowmobile with flotation sufficient to sustain it in the event it breaks through ice while being driven over the frozen surface of a lake. The purpose of the flotation was merely to prevent the snowmobile from sinking and the vehicle had no means to propel itself in the water.

It is also been suggested to construct a watercraft by removing the skis and endless track mechanism from a snowmobile and then mounting the remainder of the snowmobile on a pontoon structure. Such vehicles have typically been provided with propulsion means such as of a propeller assembly mounted to the pontoon structure and driven by the snowmobile engine. They may also include a rudder mounted to the pontoon structure and connected to the snowmobile's steering mechanism. Although such conversions expand the utility of a snowmobile, the conversion process is somewhat complex and time consuming and the resulting watercraft are somewhat cumbersome. They are also limited to use in the water and have no amphibious capability.

According, it is another object of this invention to provide for a structural assembly for converting a snowmobile to a self-propelled watercraft which is relatively simple and requires only minimal disassembly of the snowmobile in the conversion process.

It is yet another object of this invention to provide for such a structural assembly in which the resulting watercraft is propelled by the endless track assembly of a snowmobile.

Finally, it is yet another object of this invention to provide for a watercraft based upon a converted snowmobile which has amphibious capability.

SUMMARY OF THE INVENTION

This invention can be broadly summarized as providing for a snowmobile powered watercraft. The snowmobile itself is of conventional construction including power means such as a gasoline engine, an endless cleated track assembly operatively connected to the engine, a body and steerable means for mounting at least one conventional ski to the body. The watercraft includes at least one forward pontoon removable attached to the means for mounting and a U-shaped rear pontoon removably attached to the body.

In accordance with the more detailed aspect of the invention, the rear pontoon is removably attached to running boards mounted to opposing sides of the snow mobile body. According to another detailed aspect of the invention, the mounting means includes a steerable shaft which is pivotally mounted to a mounting box which in turn is removably mounted to a forward pontoon. The invention may also include a trimming device for adjusting the pitch attitude of the watercraft.

The invention can also be summarized as providing for an amphibious snowmobile powered watercraft. The snowmobile itself includes power means such as a gasoline engine, a body and steerable means for mounting at least one ski to the body. Further, the watercraft includes at least one forward pontoon removably attached to the mounting means, a U-shaped rear pontoon removably attached to the body and an endless cleated track operatively connected to the power means and extending, at least in part, below the rear pontoon.

Finally, the invention can also be summarized as providing for a structural assembly for converting a snowmobile to a watercraft. The assembly incudes at least one forward pontoon removable attachable to the snowmobile in place of its conventional ski and a U-shaped rear pontoon removeably attachable to the snowmobile body.

BRIEF DESCRIPTION OF THE DRAWINGS

FIG. 1 is a right side view of a watercraft constructed in accordance with the teachings of the present invention.

FIG. 2 is a front view of the watercraft

DETAILED DESCRIPTION OF THE PREFERRED EMBODIMENTS

Figure 3:
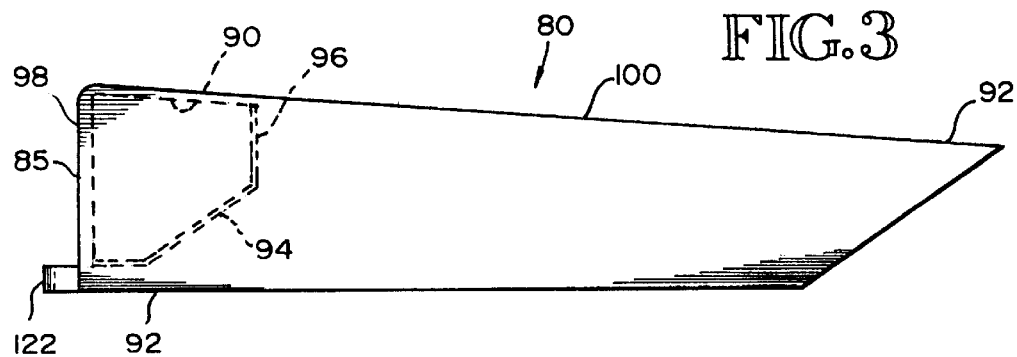
FIGS. 3 and 4 are right side and top views, respectively, of the rear pontoon portion of the structural conversion assembly.

The novel features believed to be characteristic of this invention are set forth in the appended claims. The invention itself, however, may be best understood and its various objects and advantages best appreciated by reference to the detailed description below together with the accompanied drawings.

FIGS. 1 and 2 illustrate a snowmobile powered watercraft constructed in accordance with the teachings of the present invention and generally designated by the number 10. The snowmobile itself is of conventional design, having a reinforced fiberglass body 12 within which a gasoline powered engine 14 (not shown) is mounted. An elongated cushioned seat 16 is mounted atop the rear of the body and provides seating for a driver and a passenger in tandem. The engine is connected through a centrifugal clutch and a transmission to an endless track assembly 22. The track assembly includes an endless track 24 having a plurality of spaced laterally oriented cleats 26 which grips the snow surface as the vehicle is propelled forward.

Right front suspension 30 includes upper and lower control arms 32 and 34, respectively, each of which is pivotally mounted to the body and to bracket 36. Shock absorber and coil spring assembly 38 is mounted at its lower end to bracket 36 and at its upper end to the body. Also mounted to bracket 36 is spindle 40 within which shaft 42 (not shown) is mounted for rotation. Left suspension 50 which is a mirror image of right suspension 30 includes upper and lower control arms 52 and 54, respectively, shock absorber and oil spring assembly 56 and spindle 58, each which is mounted to bracket 60. Shaft 62 (snot shown) is mounted for rotation within spindle 58. Stabilizer bar 70 which is mounted at its aft end to the body and at its forward end to bracket 36 provides fore and aft support for suspension 30. Similarly stabilizer bar 72 (not shown) extends between bracket 60 and the right hand side of the body. For travel over snow covered surfaces, a pair of skis may be pivotally mounted to the lower ends of shafts 42 and 62. Directional control of the vehicle is accomplished by simultaneous rotation of shafts 42 and 62 and corresponding simultaneous rotation of the skis by a steering mechanism (not shown) connected to the shafts and handlebar 74. These and other details of the snowmobile are typical of conventional of snowmobile construction and will not be described in greater detail.

Figure 4:
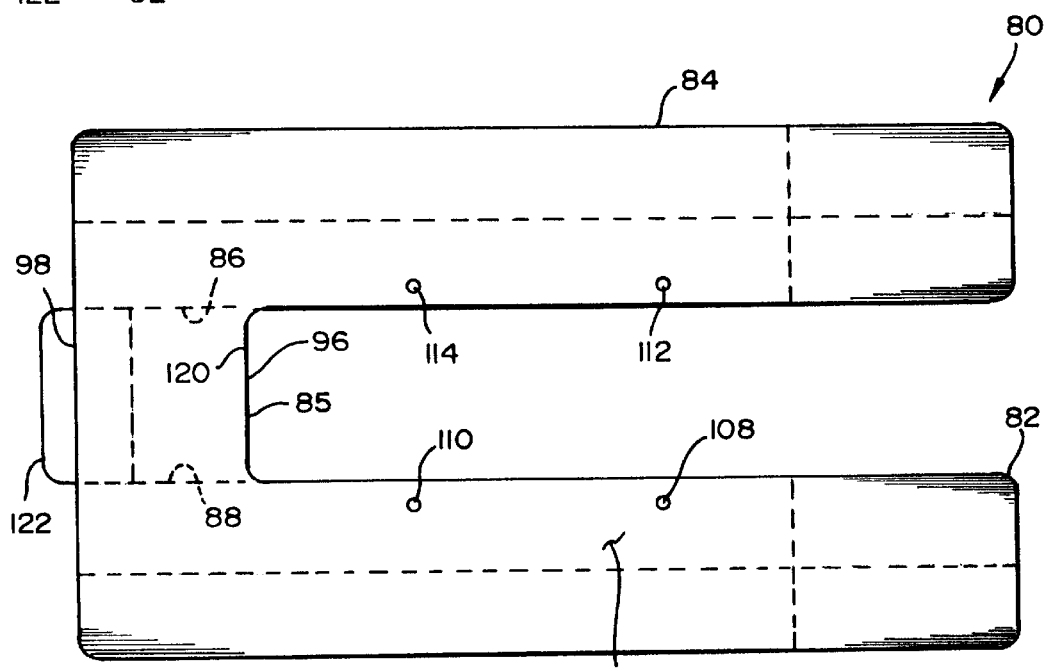
Figure 7:
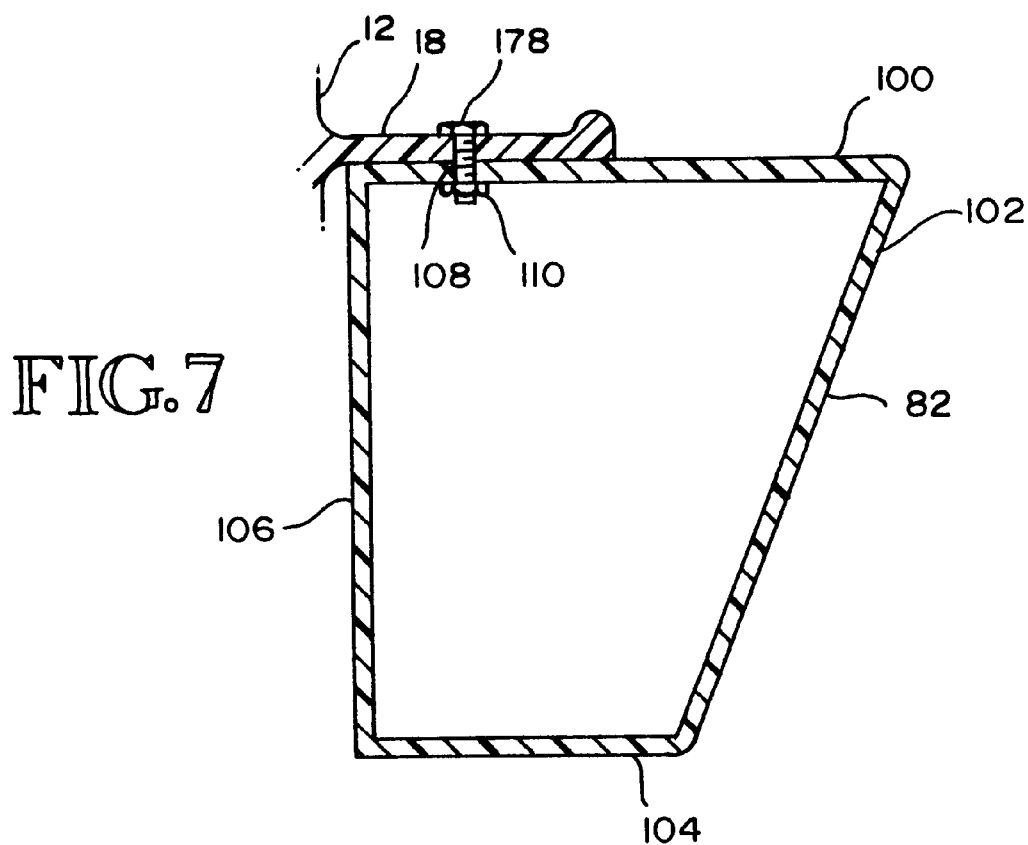
FIG. 7 is a section view taken at 7—7 of FIG. 1.

The structural assembly for converting the snowmobile into a snowmobile powered watercraft includes rear pontoon 80 and a pair of front pontoons 130 and 132. The rear pontoon which is illustrated in greater detail in FIGS. 3 and 4 is generally U shaped in configuration when viewed from the top. It includes right and left flotation tanks 82 and 84, respectively, joined by center flotation tank 85. Center tank 85 is formed by opposing walls 86 and 88, upper wall 90, lower walls 92 and 94, in the front by wall 96 and in the rear by wall 98. Swimmers step 122 extends aft of rear wall 98 to facilitate boarding of the watercraft of a person in the water. The construction of tank 82 (which is typical) is shown in more detail in FIG. 7. As can be seen it is a hollow structure bounded by walls 100, 102, 104, and 106. Hole 108 is formed in wall 100 and nut 110 is permanently mounted to the underside of the wall in alignment with the hole. Similarly, holes 112, 114, and 116 are also formed in the upper surfaces of the two legs and nuts similar to nut 110 are permanently mounted to the undersides of those surfaces in alignment with the respective holes. The rear pontoon is preferably constructed entirely of fiberglass although, it may be formed of aluminum or other suitable light weight materials if desired.

Figure 5:
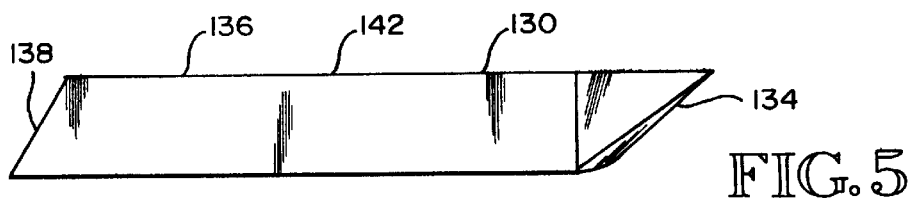
FIGS. 5 and 6 are right side and top views, respectively, of the right front pontoon, left front pontoon being identical.
Figure 6:
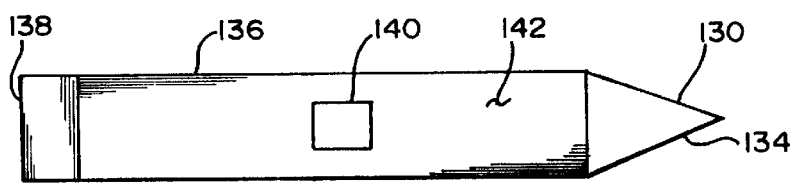
Figure 8:
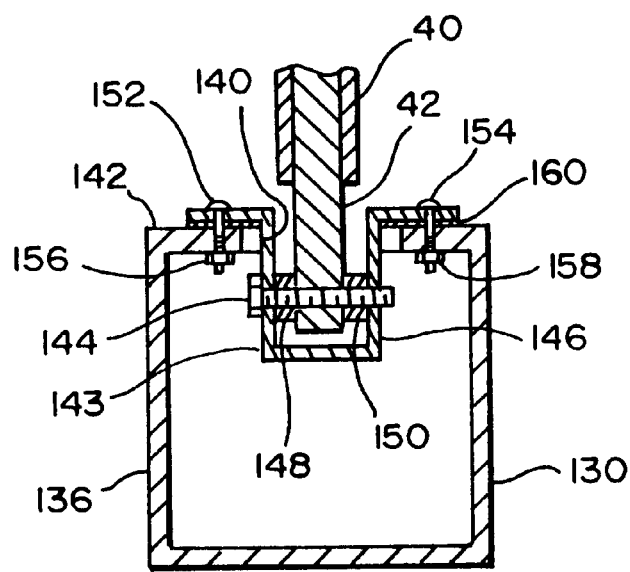
FIG. 8 is a sectional view taken at 8—8 of FIG. 1.

Front pontoon 130, which is identical to front pontoon 132, is shown more fully in FIGS. 5, 6 and 8. It includes a tapered nose section 134, and elongated body 136 which is essentially rectangular in cross section and a tapered tail portion 138. Rectangular cutout 140 is formed in upper surface 142 of the pontoon. Structural details of the mounting of the pontoon to right front suspension 30 of the snowmobile are shown in FIG. 8. Mounting box 143 which sized to be inserted in cutout 140 is pivotally mounted to shaft 42 of the suspension by bolt 144 which threadably engages wall 146 of the mounting box. Spacers 148 and 150 center the shaft with in the mounting box. The mounting box is removeably fastened to upper surface 142 by bolts 152 and 154 which engage nuts 156 and 158, respectively mounted to the underside of surface 142. Gasket 160 which surrounds cut out 140 and is disposed between upper surface 142 and mounting box 143 prevents water leakage into the interior pontoon. As with the rear pontoon the walls of the front pontoons are preferably constructed of fiberglass but aluminum may be substituted. The mounting box is formed of high strength aluminum.

Figure 9:
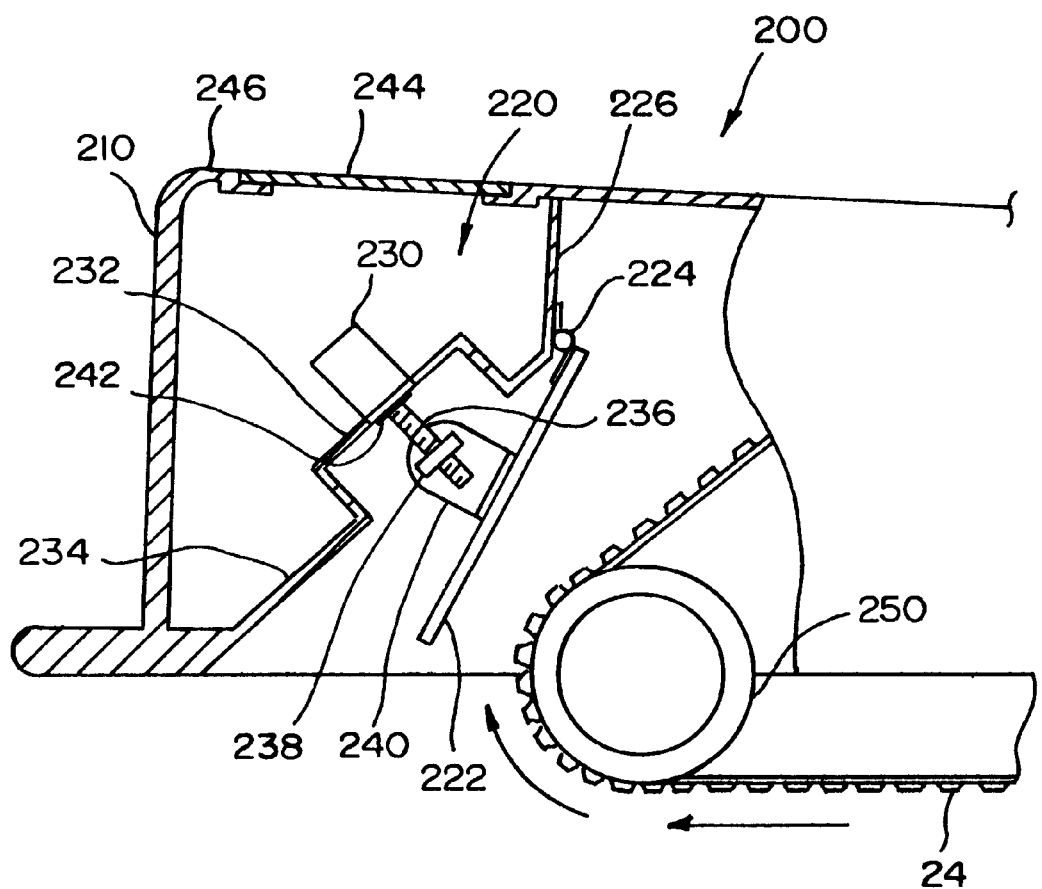
FIG. 9 is partial side view, partially cutaway, of a second embodiment of the present invention

A second embodiment of the invention which includes a trimming device for adjusting the pitch attitude of the watercraft during forward travel on water is shown in FIG. 9. As is common with many types of powered watercraft, the bow or forward part of the subject watercraft may tent to pitch upward during forward acceleration. This behavior is particularly noticeable during hard acceleration from a stationary position. The nose high attitude is undesirable because it will result in excessive drag and under some circumstances will significantly limit forward speed. The objective of the trimming device is to generate a variable upward force on the rear of the vehicle which tends to rotate it, when viewed as in FIG. 1, in a clockwise direction. Such rotation will result in a downward pitch of the forward part of the watercraft, which in turn will reduce drag and permit it to accelerate in a normal manner.

Referring to FIG. 9, the aft portion of rear pontoon 200 which is similar in detail to rear pontoon 80 except that center floatation tank 210 has been modified to include adjustable trimming device 220. The device includes flap 222 which is generally rectangular in shape and pivotally mounted by hinge assemble 224 to wall 226 of the center tank. The device also includes an actuator for positioning the flap, preferably a reversible worm drive motor 230 which is mounted to recess 232 in wall 234. Worn drive shaft 236 extends downward from the motor through worm nut 238. Worm nut bracket 240, which is attached to flap 222, is mounted to the bracket for limited translation and rotation with respect to the bracket so that it may remain aligned with worm shaft 236 as the flap is moved. Seal 242 tightly engages worm shaft 236 to prevent water from entering the motor or the interior of center tank 210.

In operation when track 24 is driven in a direction indicated by the arrows to produce forward movement of the watercraft, it passes around rear idler wheel 250 causing a stream of water to be projected at high speed in the general direction of flap 222. The impact of the water on the flap prod ice a significant force which is generally directed upward and to the rear. The amount of the force generated depends primarily on the speed at which the track is moving and the proximity of flap 222 to idler wheel 250.

Power to the motor is provided by the snowmobile's electrical system through an operator controlled switch, which permits selective control over the direction of rotation of the worm drive motor. As can be seen, rotation of the motor in one sense will cause flap 222 to rotate in one direction; rotation of the motor in the opposite direction will cause movement of the flap in the opposite direction. Therefore in order to cause the forward part of the watercraft to pitch downward the operator can engage the worm drive motor so as to rotate flap 222 in a counter clockwise direction to obtain the desired reaction. Access to the motor is provided by removable access door 244 which is sealably mounted to upper wall 246 of the center tank. Details of the worm drive motor, its power and control circuitry are well known to those or ordinary skill in the art and therefore are not described in detail.

One of the principal advantages of the present invention is the ease by which it permits the conversion of the snowmobile into a watercraft. The first step of the conversion process is to remove the conventional ski from spindle 40 and attach mounting box to it using bolt 144 and spacers 148 and 150. Then the mounting box is positioned in cutout 140 and secured to front pontoon 130 with bolts 152 and 154. Pontoon 132 is then attach to the left suspension in a similar manner. Next, rear pontoon 80 is mounted to the body by first positioning it behind the snowmobile and then moving it forward until the upper surfaces of tanks 82 and 84 contact the underside of running boards 18 and 20 and holes 108, 112, 114, and 116 are aligned with mating holes 170, 172, 174 (not shown) and 176 (not shown) respectively, in the running boards. The rear pontoon is then secured in position with four bolts such as bolt 178 which are inserted downward through the hole in the running board and threaded into previously mounted nuts such as nut 110.

A particular advantage of the new watercraft is that, unlike other snowmobile powered watercraft found in the prior art, it possesses at least some amphibious capability. As seen in FIG. 1 the lower surfaces of tanks 82 and 84 of the rear pontoon are positioned a few inches above the lower portion 190 of endless track 24 so that when the watercraft is resting on the ground the rear pontoon has a least limited ground clearance. Further, the front pontoons have the ability to slide on most sandy and grassy surfaces so that when necessary the entire vehicle can be driven from the water onto the beach and vis versa. This amphibious capability could be improved merely by mounting stationary or retractable wheels on each front pontoon forward and aft of the location of the suspension spindles.

Thus it can be seen that the present invent on provides for an improved snowmobile powered watercraft and a structural conversion assembly for producing the same which incorporates many novel features and offers significant advantages over the prior art. Although, only one embodiment of this invention has been illustrated and described it is to be understood that obvious of these modifications could be made of it without departing from the true scope and spirit of the invention.

What is claimed is:

1. A watercraft powered by a snowmobile, the snowmobile including power means, an endless cleated track assembly operably connected to the power means, a body, means including a steerable shaft for mounting at least one ski to the body, and a running board mounted to the body, the watercraft comprising:

a forward pontoon removably attached to the mounting means and including a mounting box pivotally connected to the steerable shaft and removably mounted to the forward pontoon; and a U-shaped rear pontoon removably attached to the running board, the rear pontoon including opposing flotation tanks connected by a rear flotation section.

2. A watercraft powered by a snowmobile, the snowmobile including power means, an endless cleated track assembly operably connected to the power means, a body and steerable means for mounting at least one ski to the body, the watercraft comprising:

a forward pontoon removably attached to the mounting means; and a U-shaped rear pontoon removably attached to the body; wherein the mounting means includes a steerable shaft and wherein the forward pontoon includes a mounting box pivotally connected to the shaft and removably mounted to the forward pontoon.

3. An amphibious watercraft powered by a snowmobile, the snowmobile including power means, a body, and steerable means for mounting at least one ski to the body, the watercraft comprising:

a forward pontoon removably attached to the mounting means; and a U-shaped rear pontoon removably attached to the body; and an endless cleated track operably connected to the power means and extending at least in part below the rear pontoon; wherein the mounting means includes a steerable shaft and wherein the forward pontoon includes a mounting box pivotally connected to the shaft and removably mounted to the forward pontoon.

4. A structural assembly for converting a snowmobile to a watercraft, the snowmobile including power means, an endless cleated track assembly operably connected to the power means, a body and structural means for mounting a ski to the body, the structural assembly comprising:

a forward pontoon removably attachable to the mounting means; and a U-shaped rear pontoon removably attached to the body; wherein mounting means includes a steerable shaft and wherein the forward pontoon includes a mounting box pivotally connected to the shaft and removably mountable to at least one forward pontoon.

* * * * *